May 8, 1934.   R. S. HOPKINS ET AL   1,957,889
PHOTOGRAPHIC RECORDING APPARATUS
Filed Aug. 30, 1930   5 Sheets-Sheet 1
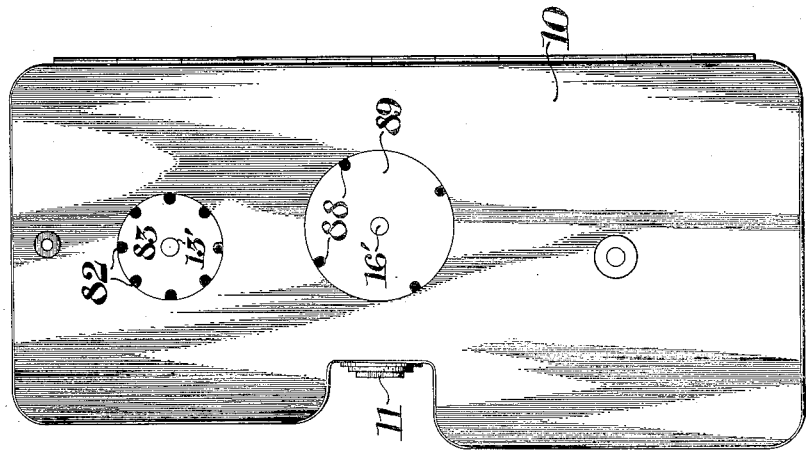
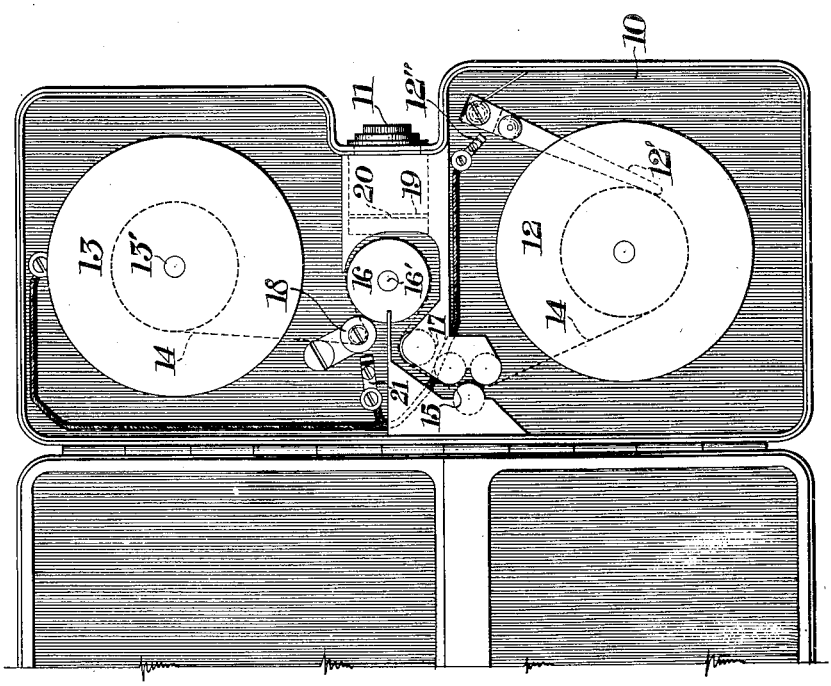
Inventors,
Roy S. Hopkins & Carter J. Hughey,
By Newton M. Perriss
Holla N. Carter
Attorneys

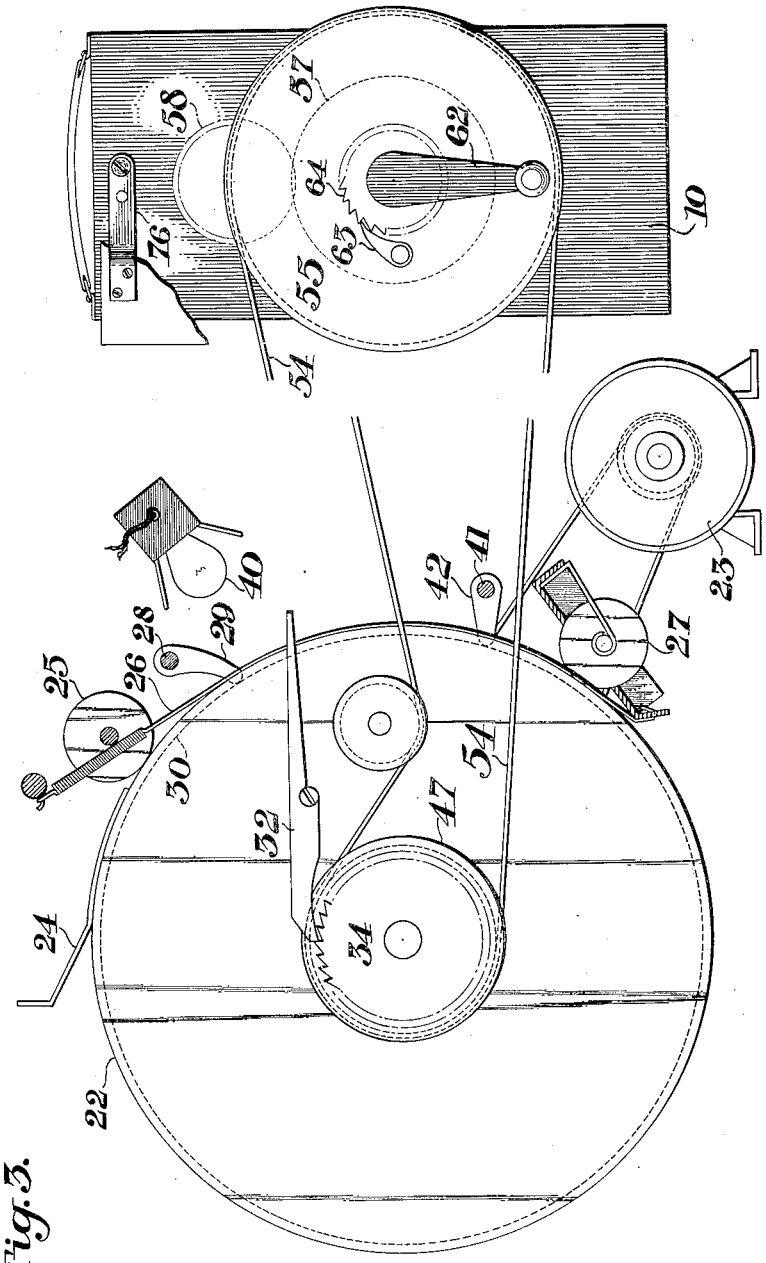

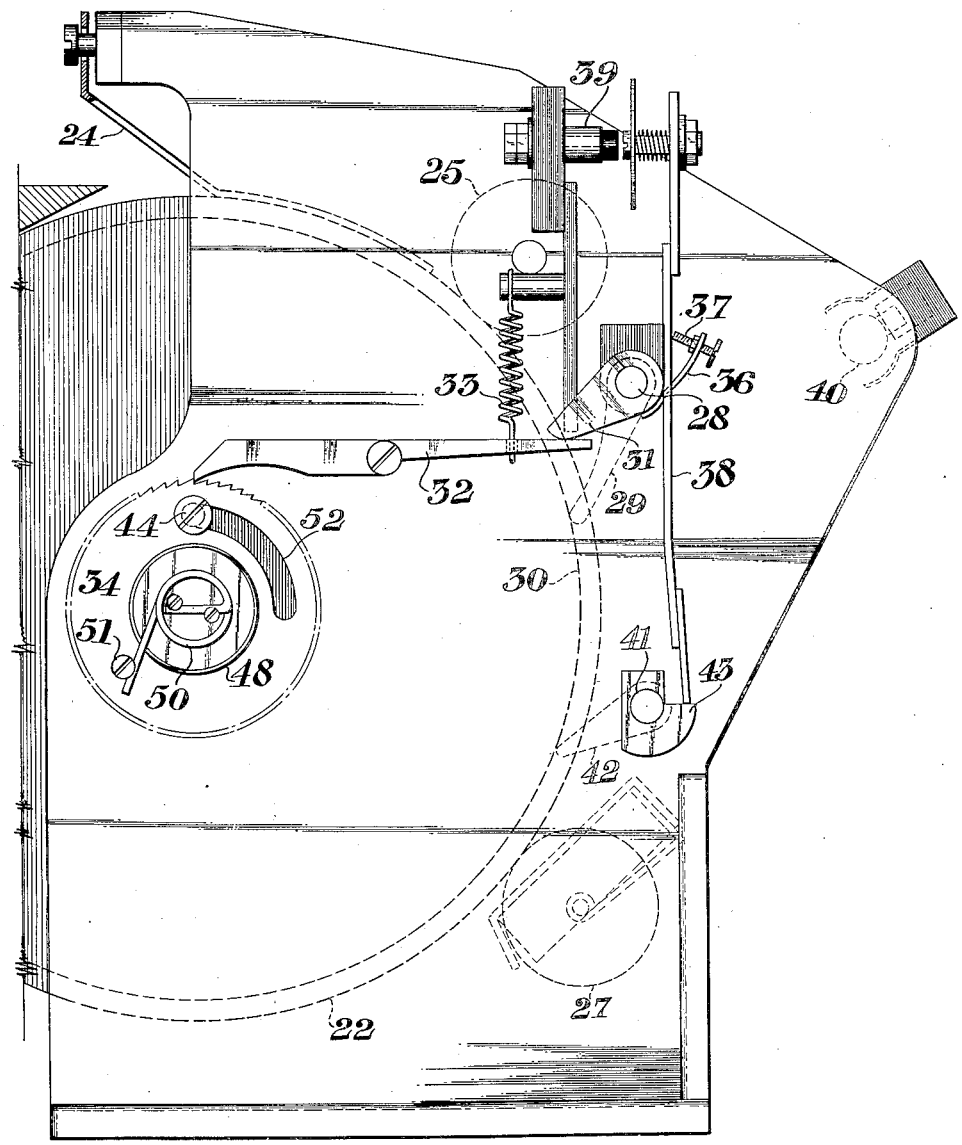

May 8, 1934.  R. S. HOPKINS ET AL  1,957,889
PHOTOGRAPHIC RECORDING APPARATUS
Filed Aug. 30, 1930   5 Sheets-Sheet 4
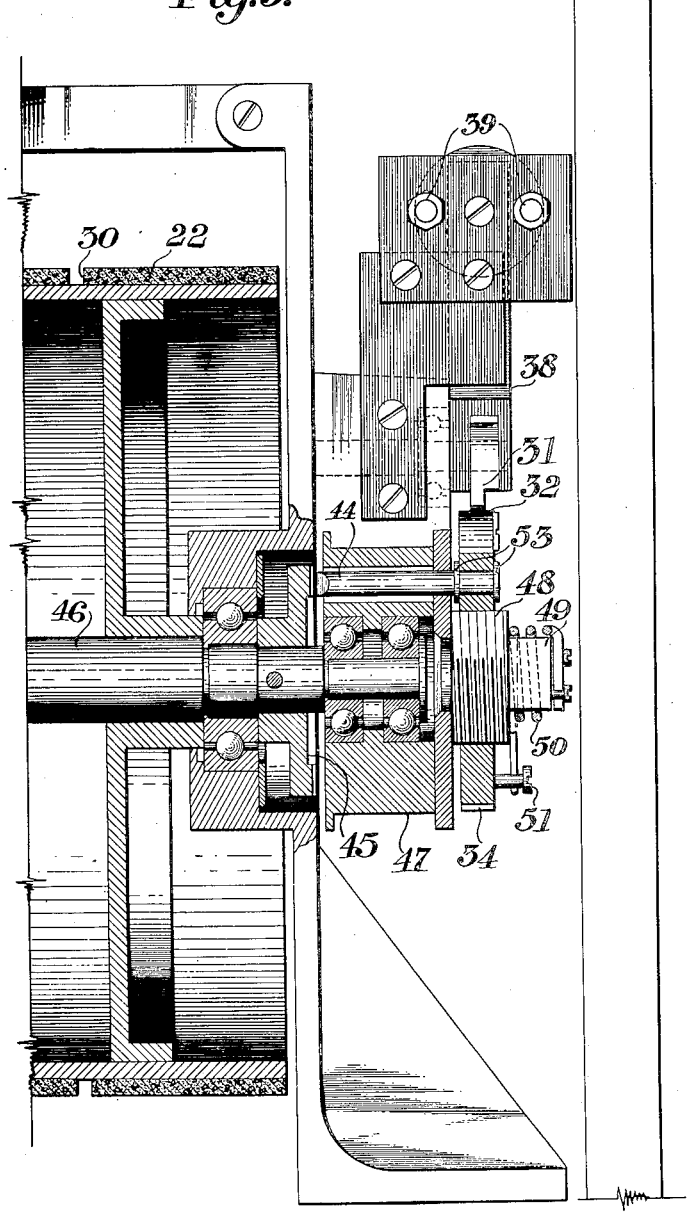
Inventors,
Roy S. Hopkins and Carter J. Hughey,
By Newton M. Perrins
Rolla N. Carter
Attorneys.

May 8, 1934.    R. S. HOPKINS ET AL    1,957,889
PHOTOGRAPHIC RECORDING APPARATUS
Filed Aug. 30, 1930    5 Sheets-Sheet 5

Roy S. Hopkins and
Carter J. Hughey,
Inventors

Patented May 8, 1934

1,957,889

UNITED STATES PATENT OFFICE 1,957,889

PHOTOGRAPHIC RECORDING APPARATUS

Roy S. Hopkins and Carter J. Hughey, Rochester, N. Y., assignors to Eastman Kodak Company, Rochester, N. Y., a corporation of New York Application August 30, 1930, Serial No. 478,838

3 Claims. (Cl. 88—24)

Our invention relates to photographic apparatus for the recording of graphic records such as documents, drawings, pictures and all matter appearing in sheet form usually on paper. An object of our invention is to provide apparatus for bodily carrying the sheets of paper bearing the graphic records through the photographic field of a camera, together with mechanism for operating the camera only during the time a sheet is passing through its photographic field.

Another object of our invention is to provide apparatus for either continuous or intermittent operation which enables the recording of sheets of unlimited length as well as small sheets such as bank checks and in which the film is advanced only when a sheet to be recorded is in the photographic field of the camera.

Our invention contemplates the use of a camera of the motion picture type in which the film is advanced uniformly during the recording operation, the advancement of the film being controlled by the presence of a sheet in the photographic field.

Other objects and advantages of our invention will appear in the following description when read in connection with the accompanying drawings and its scope will be pointed out in the accompanying claims.

Figure 1 is a side elevation of a camera with its cover open.

Figure 2 is a side elevation of the opposite side of the camera.

Figure 3 is a side view of the assembled apparatus with certain parts omitted.

Figure 4 is a partial end view of the drum showing the clutch and illumination control mechanism.

Figure 5 is a sectional side view of the end of the drum illustrated in Figure 4.

Figure 6:
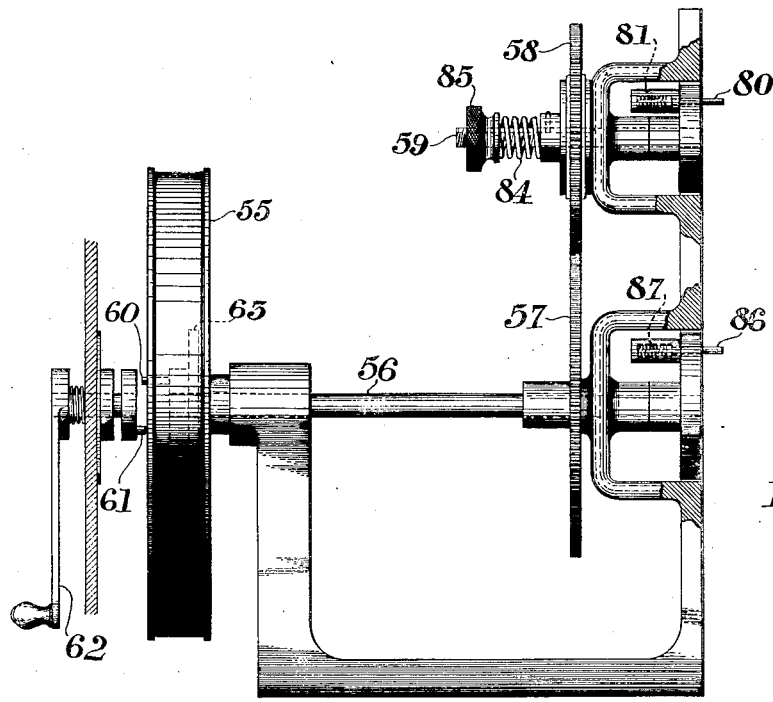
Figure 6 is a perspective view partly in section of the camera drive mechanism.
Figure 7:
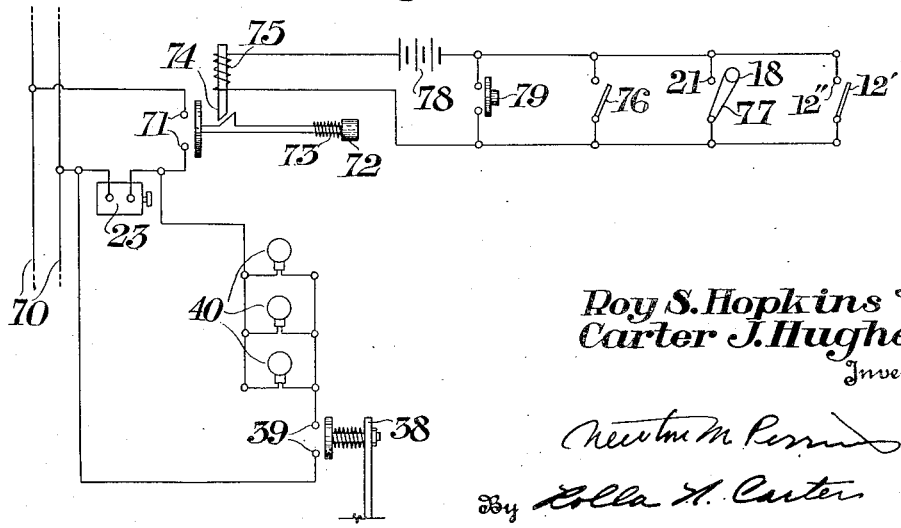
Figure 7 is a schematic wiring diagram for the complete apparatus.

Referring to the drawings, the camera 10 of the motion picture type, and equipped with the usual focusing lens 11 is provided with supply and take-up reels 12 and 13 upon which is wound the usual length of film 14 which passes from the supply reel 12, through the light excluding passage 15 and around the roller 16 to the take-up reel 13. The idlers 17 and 18 train the film 14 over the roller 16 which is so positioned that the film passes through the focal plane of the lens 11. Positioned between the lens 11 and the roller 16 is the shield 19 provided with the light slit 20 which permits only a very narrow beam of light to fall upon the film 14 at its point of tangency with the focal plane of the lens 11. Due to the narrowness of the focal plane utilized the cylindrical surface of the film 14 is substantially parallel to the focal plane of the lens 11. The idler 18 is normally engaged with the contact 21 and is held therefrom by the tension of the film 14.

The camera 10 is focused on the surface of the horizontal drum 22 which is adapted to be rotated by a suitable motor 23 to carry sheets through the photographic field of the camera which, due to the slit 20, covers so small a portion of the circumference of the relatively large drum 22 that the curvature thereof is immaterial.

The sheet to be photographed is fed on the continually rotating drum 22 under the guide shield 24 and is carried under the rollers 25 and the tensioned wires 26, which serve to keep the sheet flat and firmly pressed against the drum 22 during its passage through the photographic field of the camera 10. At the lower end of the wires 26 a second set of rollers 27 serve to free the sheet from the wires 26, after which the sheet is discharged from the machine.

Fixedly mounted on the shaft 28 are a plurality of fingers 29 which normally ride in the circumferential grooves 30 axially spaced along the drum 22 and are adapted to be displaced from the groove 30 by a sheet passing thereunder.

As the sheet travels on the drum 22, it impinges with the fingers 29 causing them to rotate the shaft 28 until the ends of the fingers ride on the surface of the sheet. Rotation of the shaft 28 rotates the cam 31 mounted thereon through a small angle which rotates the pawl lever 32 against tension of the spring 33 and disengages it from the ratchet 34, permitting the clutch 35 to drive the camera 10 as will be described hereinafter. Rotation of the cam 31 carries with it the arm 35 bearing set screw 37 which engages with and rotates the lever 38 to close the light contact 39 which energizes the lamp 40 to illuminate the photographic field of the camera 10.

Below the photographic field of the camera and fixedly mounted on the shaft 41 are a plurality of fingers 42 which normally ride in the grooves 30 of the drum 22 and are adapted to be displaced therefrom by a sheet carried on the surface of the drum 22. Displacement of the fingers 42 rotates the shaft 41 and the shouldered cam 43 mounted on the end thereof. It is to be noted that the lower end of the lever 38 has already been displaced by passage of the sheet under the fingers 29 so that the cam 43 is free to rotate into a position to prevent the lever 38 being rotated to open the contact 39.

The clutch 35 which we have illustrated comprises a pin 44 adapted to engage a tooth of the flanged bracket 45 rigidly mounted on the shaft 46 of the drum 22, the engagement of the pin 44 with the gear 45 being controlled by axial movement of the ratchet 34. Suitably mounted on the end of the drum shaft 46 and between the flanged ratchet 45 and the ratchet 34 is the flanged pulley 47 through which the pin 44 extends. The threaded shaft 48 adapted to receive the threaded opening of the ratchet 34 is riveted at one end to the outer flange of the pulley 47 and is provided at its outer end with the reduced portion 29 around which is mounted the spring 50 adapted to rotate the ratchet 34 in a clockwise direction on the threaded shaft 48 by engagement with the screw 51.

The pin 44 is carried in the arcuate slot 52 provided in the ratchet wheel 34 and is retained therein by the flanges 53. The length of the slot 52 is such that sufficient clockwise rotation of the ratchet wheel 34 on its right-handed threaded shaft 48 is permitted to carry the pin 44 into engagement with the flange ratchet 45 and sufficient counter clockwise rotation is permitted to carry the pin 44 out of engagement with the flange ratchet 45.

The take-up reel 13 is frictionally driven by the pulley 47 through the belt 54, pulley 55, the shaft 56, the gear 57 and the gear 58 frictionally mounted on the shaft 59 and the take-up reel 13.

The driving connection between the shaft 59 and the take-up reel 13 is illustrated as comprising a pin 80 adapted to be forced by the spring 81 into any one of the recesses 82 provided in the flange 83 mounted on the take-up spindle 13'. The frictional mounting of the gear 58 on the shaft 59 is maintained by the spring 84, the pressure of which is adjustable through the nut 85 fitted on the threaded portion of the shaft 59.

To reduce the friction in the film path the roller 16 is adapted to be similarly driven by the shaft 56 through the pin 86 adapted to be forced by the spring 87 into any one of the recesses 88 provided in the flange 89 mounted on the shaft 16'.

The ratio of the gears 57 and 58 is such as to insure that the roller 16 will never feed film faster than it is taken up on the reel 13.

To provide for manual operation of the take-up reel the end of the shaft 56 is provided with the pin 60 adapted to be engaged by the pin 61 of the bell crank 62, the pawl 63 and the ratchet 64 permitting rotation in one direction.

The apparatus is adapted to be driven by connecting the motor 23 to any suitable source of supply 70 through the switch 71 which is closed by pressing the push button 72. The switch 71 is biased to open position by the spring 73 and is latched in closed position by the armature 74 of the relay 75. When the push button 72 is operated it closes the switch 71 and the drum 22 is rotated by the motor 23, the clutch 35 being in released position. In order for the switch 71 to remain closed, the circuit of the relay must remain open and this fact is taken advantage of to prevent operation of the apparatus when the camera 10 is not in position or when there is insufficient tension on the film 14 due to breakage or when the film on the supply reel is exhausted. These features are carried out by providing two switches 76, 77 and 12". Each of them connect the relay 75 to a suitable source of supply 78. The spring switch 76 is biased to closed position and is held in open position by placing the camera 10 in its support. The switch 77 comprises the contact 21 and the idler 18 which is biased to closed position and is held open by the tension of the film 14. It is obvious that if either the camera 10 is not mounted in the apparatus or there is no tension on the film 14, the relay 75 will be energized by the source of supply 78 and will lift the armature 74 whereby the switch 71 will not be held closed and the motor 23 will not run.

In order to prevent operation of the motor 23 when there is no film on the supply reel 12 the arm 12' biased to engage the contact 12" is provided and is adapted to be held therefrom by the film wound on the supply reel 13. As soon as the film is exhausted the arm 12' engages the contact 12" to energize the relay 75 and stops the motor 23.

With the camera 10 in position and tension on the film 14 the button 72 is pushed to close the switch 71 which is held in closed position by the armature 74, and the motor 23 drives the drum 22. A sheet to be recorded is placed on the rotating drum 22 which carries it under the guide shield 24, the rollers 25, the wires 26, the lower rollers 27 and discharges it from the apparatus. As the sheet passes under the wires 26 and approaches the photographic field of the camera, it lifts the fingers 29 to rotate the shaft 28 which energizes the lamps 40 to illuminate the photographic field and disengages the pawl 32 from the ratchet 34. The coiled spring 50 now rotates the ratchet 34 in a clockwise direction on the threaded shaft 48 to engage the pin 44 with the flanged ratchet 45 and the pulley 47 is rotated to advance the film 14. After the forward edge of the sheet has passed through the photographic field it lifts the fingers which rotates the shouldered cam 43 into position for holding the contact 39 closed. As the rear edge of the sheet approaches the photographic field the fingers 29 are released and the spring 33 returns pawl 32 into engagement with the ratchet 34, thereby stopping it. Further rotation of the pulley 47 turns the threaded shaft 48 within the ratchet wheel 34 to force it outwardly thereon. Since it carries the pin 44 with it, the pin 44 is disengaged from the flanged ratchet 45 and the pulley 47 stops. This halts further advancement of the film 14.

The partial revolution of the drum 22 after the sheet has released the fingers 29 and before the clutch disengages carries the end of the sheet through the photographic field and approximately coincident with the stopping of the film the sheet clears the fingers 42, permitting the shaft 41 to rotate the cam 42 out of the path of the switch lever 38, permitting the contact 39 to open the circuit of the lamps 40.

When it is desired to disconnect the motor 23 from the source of supply 70 the button switch 79 is pressed to complete the circuit of the relay 75 which lifts the armature 74 and the spring 73 opens the switch 71 in the motor circuit.

From the above description it will be noted that the photographic field will be illuminated and the film will be advanced only when a sheet is passing through the photographic field of the camera.

It is obvious that with the apparatus of our invention a sheet of any length may be fed over the constantly rotating drum and may be photographed on a motion picture film which is continuously advanced, the speed of the film and sheet being in proportion to their distance from the lens, no shutter being employed.

While we have described in detail one way of practicing our invention to comply with the patent statutes, we wish it understood that we do not intend to be limited to the exact apparatus described inasmuch as in view of the disclosures obvious modifications will readily suggest themselves to those familiar with this art without departing from the spirit of our invention or the scope of the claims herein.

What we claim as new and desire to secure by Letters Patent of the United States is:

1. Photographic recording apparatus comprising a camera provided with a continuous strip of film, a rotating drum for carrying discrete documents past said camera, said drum being back of the documents while they pass the camera, means for holding said documents on the drum, and means controlled by said documents for advancing said film during passage of the documents past said camera and for stopping said film when no documents are passing the camera.

2. A photographic recording machine having in combination, a lamp, a camera, a continuously rotating drum for bodily carrying documents to be recorded through the photographic field of the camera, and forming a backing for the documents during their passage through said camera field, means for holding said documents on the drum, means normally disconnected from the drum to actuate said camera, means for operatively connecting said camera actuating means and said drum, means for energizing said lamp, means controlled by the entrance of a document into the field of the camera for actuating said energizing means and said means for operatively connecting said camera actuating means and the rotating drum, and means controlled by the document for deenergizing said lamp after the entire document has passed through said photographic field.

3. In photographic recording apparatus, in combination, a camera, a rotating drum for carrying discrete documents into, through and out of the photographic field of the camera, normally disconnected driving means between the rotating drum and the camera, an overrunning clutch for connecting the driving means for actuating the camera and means controlled by the presence of a document on said drum and in advance of said field for operating said clutch, the overrun of said clutch being sufficient to maintain said driving means connected until the rear edge of the document has been carried out of said photographic field.

ROY S. HOPKINS.
CARTER J. HUGHEY.